UNITED STATES PATENT OFFICE.

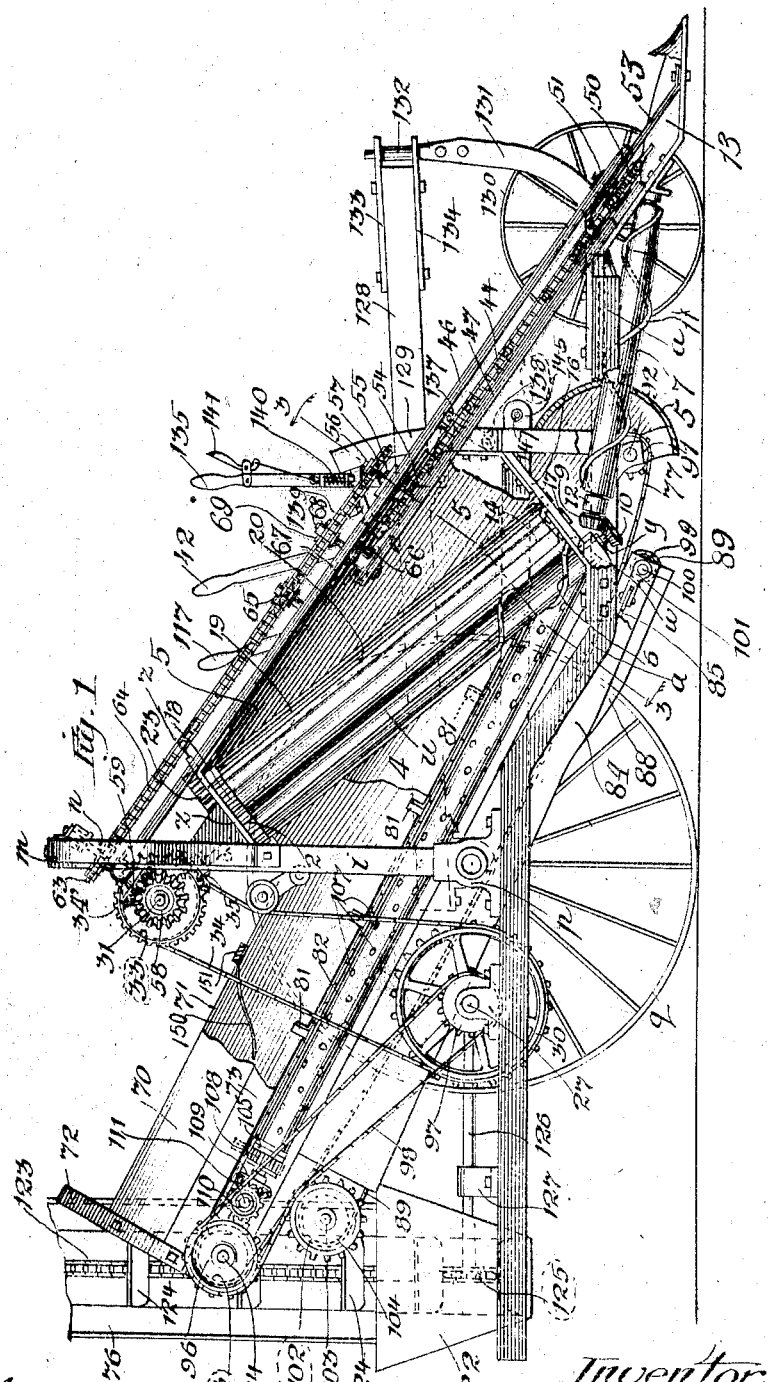

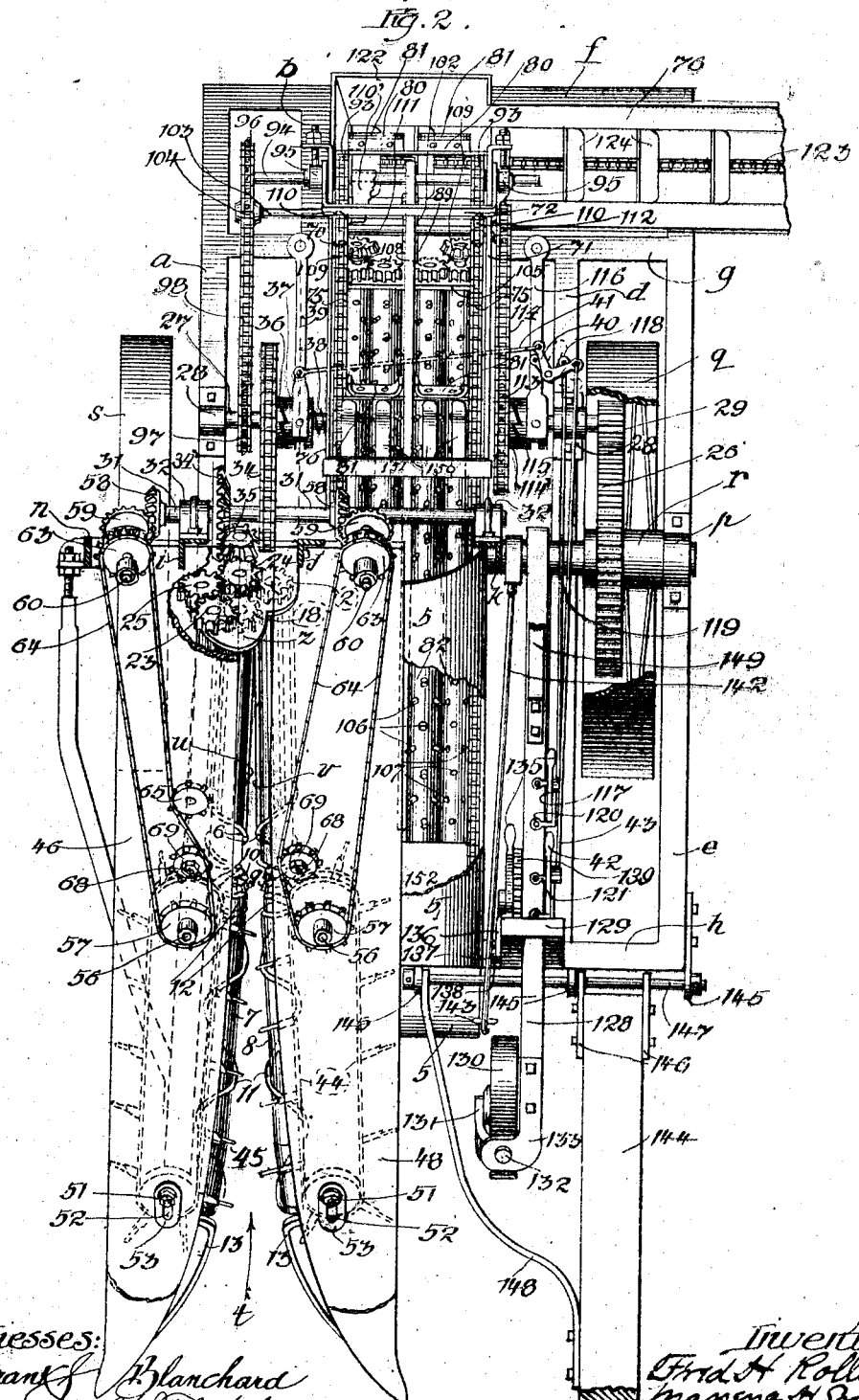

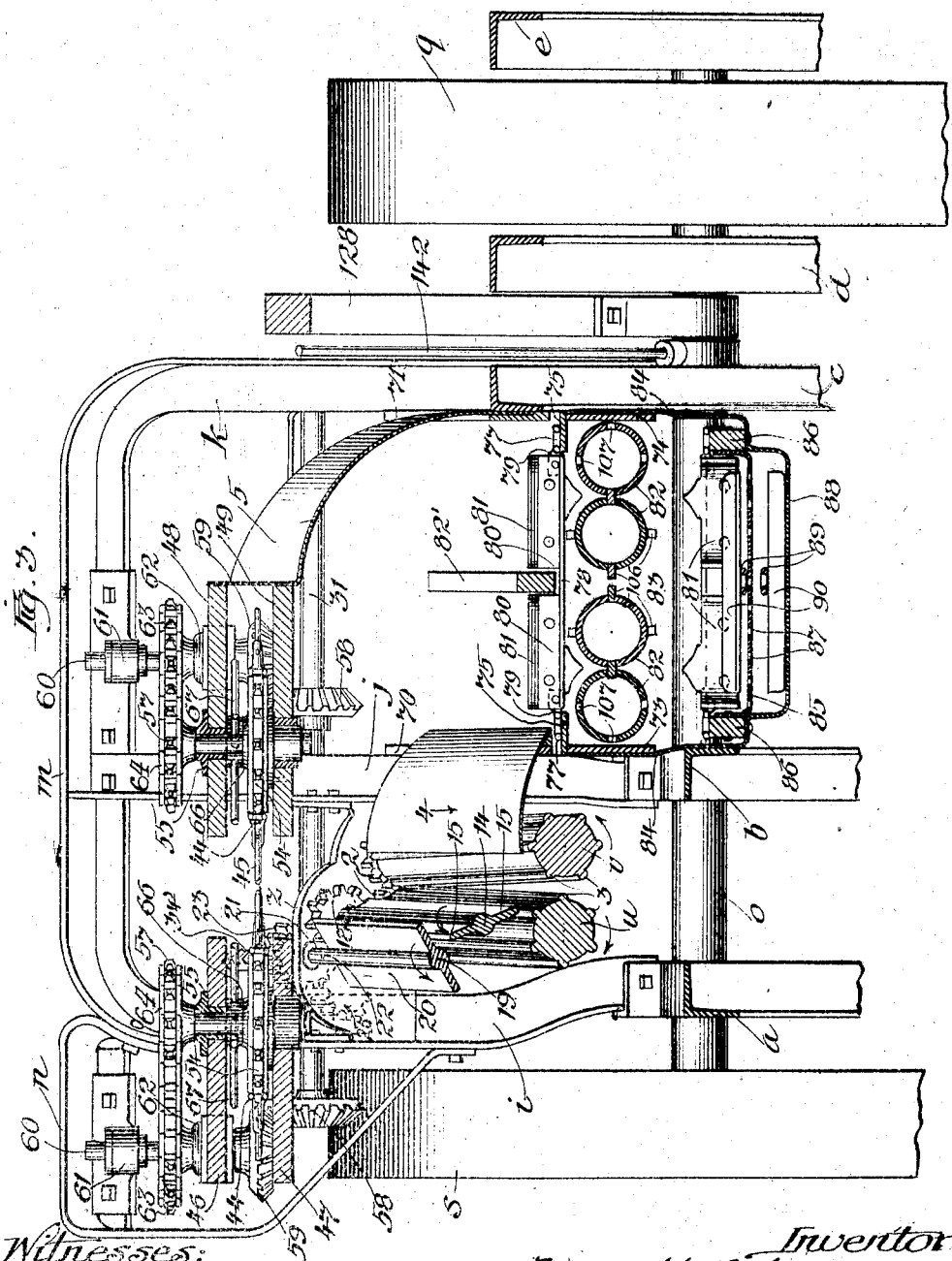

FRED H. ROLLINS, OF KIRKLAND, AND MASSENA H. SNOW, OF BLACKBERRY TOWNSHIP, KANE COUNTY, ILLINOIS.

CORN-HARVESTING MACHINE.

1,049,400.   Specification of Letters Patent.   Patented Jan. 7, 1913.

Application filed April 8, 1911. Serial No. 619,737.

*To all whom it may concern:*

Be it known that we, FRED H. ROLLINS, residing in Kirkland, in the county of DeKalb and State of Illinois, and MASSENA H. SNOW, residing in Blackberry township, Kane county, Illinois, both citizens of the United States, have jointly invented certain new and useful Improvements in Corn-Harvesting Machines, of which the following is a specification.

This invention relates to that class of corn harvesting machines which are adapted to be used for removing the ears of corn from the stalks and for carrying or husking and conveying the ears into a suitable receptacle.

The principal object of the invention is to provide a simple, economical and efficient corn harvesting or picking and husking machine.

A further object is to provide a corn harvesting or picking machine having gripping or feed rolls and rotary beater mechanism so constructed and arranged as to reduce to a minimum or prevent the winding of fibrous material about such rotary members and remove the ears from the stalks and deliver them to a conveyer, husking mechanism or receptacle without injury to the ears of corn; to provide husking mechanism or rolls having conveyer or elevator mechanism operatively connected therewith, and all so constructed and arranged as to remove and separate the husks from the ears of corn, and, during the husking operation, convey or elevate the corn into a suitable receptacle by causing the ears of corn to be carried upward over the husking mechanism or rolls and husked by the latter during such upward movement, and to enable the corn to be received and carried away from the picking mechanism and subjected to the action of the husking mechanism or rolls by the same conveyer or elevator.

A further object is to provide means for separating the shelled corn from the husks and refuse and saving the same in an efficient manner after such shelled corn and husks pass between the husking rolls which form the bottom of the elevator or conveyer, and to so construct and arrange the various parts of the machine as to reduce side draft to a minimum while the machine is in operation and enable the machine to operate upon a row of corn not straddled by the team which draws the machine.

Other and further objects of the invention will appear from an examination of the drawings and the following description and claims.

The invention consists in the features, combinations, and details of construction herein described and claimed.

In the accompanying drawings Figure 1 is a view in side elevation of a machine constructed in accordance with our improvements and invention, with one of the supporting wheels and other parts broken away or omitted for clearness; Fig. 2, a plan view of the same, with part of the main traction wheel and part of the casing of the husking and conveyer mechanism broken away; and Fig. 3, an enlarged detail view in cross section, taken on line 3, of Fig. 1, looking in the direction of the arrow, and showing the gripping or feed rolls, the plurality of rotary beaters, the husking rolls, the conveyer or elevator for the ears of corn, and the screen and shelled corn conveyer all in transverse section.

In constructing a corn harvesting machine or corn picking and husking machine in accordance with our invention and improvements we provide a main frame comprising longitudinally extending bottom-frame members $a$, $b$, $c$, $d$, and $e$, transverse bottom-frame members $f$, $g$ and $h$, and uprights $i$, $j$, and $k$, connected by a transverse top portion or frame member $m$, and forming an upright frame portion which is provided with a laterally projecting bracket or frame portion $n$. The main frame is supported upon an axle $o$ which is journaled is suitable bearings $p$, $p$, preferably at the bottom of the upright frame portion above described. A main supporting and traction wheel $q$ having a hub $r$ forms a support for one end of the axle, and a supporting wheel $s$ is mounted upon and forms a support for the opposite end of the axle. These wheels and axle support the frame in such a manner as to properly balance it and permit the main frame to be tipped or tilted to different angles of inclination as desired. The forwardly projecting bottom frame portions *a* and *b* have their forward ends depressed or located below the level of the main bottom-frame of which they form a part and are a sufficient distance apart to provide a passage *t* therebetween adapted to permit said frame portions to pass on opposite sides of any row of corn to be operated upon, or, in other words, adapted to permit the stalks of standing corn or corn to be operated upon to pass between said forwardly projecting frame portions which extend forward from the axle and diverge at their front ends and form supports for the picking mechanism including the gripping or feed rolls, the rotary beater mechanism, the feed chain mechanism, shield and heliced or spirally ribbed bottom grain-supporting feed rolls hereinafter described.

Mounted upon opposite sides of the passage *t* formed between the forwardly projecting frame portions *a* and *b* and extending upward and rearward at an incline are a pair of gripping or feed rolls *u* and *v*, the first mentioned roll being secured at its lower end to the frame portion *a* by means of a suitable bearing member or bracket *w* which is provided with a bearing sleeve or boxing *y* through which the bottom journal of said roll extends, (as shown in Fig. 1) and the roll *v* being mounted in the same manner or similarly upon the frame member *b*. The upper ends of these gripping or feed rolls are journaled in suitable bearings in an upper inclined plate or bracket *z* and are each provided with a spur gear or pinion 2 in toothed engagement with each other and fixed to said gripping rolls respectively, as shown in Fig. 3. The main body portion of each of these gripping rolls is provided with a series of laterally projecting ribs 3 and are so mounted that they converge toward their upper ends and diverge at their lower ends sufficiently to leave a space therebetween adapted to permit corn stalks to pass between said rolls and to be gripped between the ribbed portions thereof. Mounted in front of the roll *v* is an outwardly and downwardly inclined plate or shield 4 the inner or forward upper edge of which is directly in front of said roll and extends throughout substantially the entire length of the latter at substantially the same incline and in position to prevent the ears of corn from coming into contact with the roll *v*. This plate or shield forms one side of the lower portion of the conveyer or elevator and husking device hereinafter described, and the opposite or outer side of which elevator is formed by a curved casing portion 5, shown in Figs. 1, 2, and 3. The lower end of each of the rolls *u* and *v* respectively, is provided with a spiral or helical rib or ribs 6 as shown in Fig. 1, for feeding the stalks upward and rearward. Bottom heliced or spirally ribbed feeding and grain-supporting rolls 7 and 8 are connected at their rear ends with the bottom ends of the gripping rolls *u* and *v* respectively by means of beveled gears or pinions 9 fixed to said bottom rolls and beveled pinions 10 fixed to the bottom ends of said gripping or main inclined feed rolls *u* and *v*, respectively. These bottom rolls 7 and 8 are each provided with a helical or spiral rib 11 which is so disposed as to feed the stalks and corn rearward as said rolls are rotated by means of the gripping rolls and the mechanism for operating the latter, and are supported at their opposite ends by means of journal bearings or brackets 12 and 13, the forward brackets 13 being curved outward and forward on opposite sides of the passage *t* so as to form fenders or guards for guiding the stalks between the forward ends of the bottom rolls 7 and 8, which are at an angle with respect to the gripping rolls *u* and *v* with which they are connected.

Mounted in front of and over the gripping roll *u* and preferably extending upward and rearward at the same incline or parallel with said gripping rolls is a rotary beater 14 having laterally projecting beater blades 15 which rotate upward and forward in front of or over the passage or space between the gripping rolls and in a direction opposite to the direction of rotation of the gripping roll *u* in front of which such rotary beater is mounted. This rotary beater is journaled at its lower end in a suitable supporting bracket or bearing member 16 (shown in Fig. 1,) in a boxing 17, which may be of any ordinary or desired form, and is provided at its upper end with a spur gear 18 fixed thereto and in toothed engagement with the spur gear 2 on the gripping roll *u*. (See Fig. 3.) A similar rotary beater 19 having laterally projecting beater blades 20 is mounted in front of and over the beater 14 preferably at the same incline or parallel with respect to the latter, and is journaled at its bottom end in the supporting bracket or bearing member 16 in which it is adjustably secured or supported by means of an adjustable boxing (not shown) which may be of any ordinary desired or well known form of sliding journal box whereby the beater may be adjusted with respect to the adjacent rotary member or beater 14. The upper end of the rotary beater 19 is journaled in the supporting bracket *z* in a suitable bearing sleeve or box 21, (see Fig. 3) and is provided with a shank or shaft portion 22 which extends through the bracket *z* and on which is fixed a spur pinion 23. A similar spur pinion 24 is fixed to the upper end of the rotary beater 14 above the bracket or plate z and above the spur gear 18 which has already been described as meshing with the spur pinion 2 on the gripping roll u, (see Figs. 2 and 3) and a toothed idler 25 is mounted on the upper side of the bracket z and in toothed engagement with the pinions 23 and 24 as shown in Fig. 2. The spur pinions 23 and 24 are thus operatively connected by means of said idler in such a manner that they and the rotary beaters will rotate in the same direction and in a direction opposite to the direction of rotation of the gripping roll u. The rotary beaters 14 and 19 are so disposed and operatively connected that their laterally projecting blades extend substantially at right angles, and the blades of said beaters respectively are adapted to pass each other while rotating in the same direction, as indicated in Fig. 3. I prefer to so arrange the beaters that the inner upwardly and forwardly moving edge of the upper beater is directly over and in front of the central portion of the beater 14 and center of the gripping roll v, said upper beater being a greater distance from the inner adjacent sides of the gripping rolls and the center of the passage between said rolls than is the lower beater.

In order to provide suitable and efficient means for operating the feed rolls and beater mechanism above described, and for operating the other parts of the machine hereinafter described, the main traction wheel q is provided with a spur wheel 26 fixed to the hub and preferably inside of the rim of said traction wheel, as shown in Fig. 2. A main driving shaft 27, mounted in suitable journal bearings 28 in the main frame, is provided with a spur pinion 29 in toothed engagement with the gear 26, and with a sprocket wheel 30. A counter shaft 31 is journaled in suitable bearings 32 in the upper part of the main frame and is provided with a sprocket 33 fixed thereon and connected with the main driving shaft 27 by means of a sprocket chain 34 in engagement with the teeth of said sprockets 30 and 33 respectively. A bevel gear wheel 34' is mounted upon and in fixed relation to the counter shaft 31, and a bevel pinion 35 is mounted upon the upper end of the gripping or feed roll u above the bracket or plate z and in toothed engagement with said bevel gear wheel 34. The sprocket wheel 30 on the shaft 27 is provided with a clutch member 36, and a movable clutch member 37, mounted slidably upon the shaft 27 and adapted to be operated in one direction by a compressible spring 38 is movable into and out of clutching engagement with the clutch member 36, whereby the picking mechanism including the gripping rolls and beaters above described are adapted to be connected with and disconnected from the main traction wheel or source of power, as desired. The slidable clutch member 37 is provided with an operating lever 39 in operative engagement therewith and pivotally mounted on the main frame, the lever 39 being connected with a bell-crank lever 40 by means of a connecting rod 41, said bell-crank lever being pivoted on the main frame and connected with a hand lever 42 by means of a connecting rod 43.

By the above arrangement it will be seen that, as the machine is pulled or driven forward with the frame portions a and b and the rolls supported thereby on opposite sides of the row of corn to be operated upon, the gripping rolls will be caused to rotate in opposite directions in such a manner that their adjacent peripheries and peripheral ribs will move inward and rearward so as to grip the stalks of corn and pull them rearward and somewhat downward, and the rotary beaters will both be rotated in the same direction but in a direction opposite to the direction of rotation of the gripping roll u in front of and over which they are located, their laterally projecting blades moving forward and upward on the inner side of said beaters or on the side nearest to the center of the passage between the gripping rolls, thus being adapted to strike the ears of corn and knock them off the stalks and over the inclined and curved shield or fender 4 and directly onto the husking rolls and into the conveyer or elevator hereinafter described, and before the ears are permitted to come into contact with the gripping rolls, thus preventing the ears from being crushed or shelled or in any way injured by the gripping rolls. The upper rotary beater blades prevent the stalks and fibrous material from winding around the beater 14, and the blades of the beaters respectively, move alternately into position to strike the ears. The bottom spirally ribbed feeding and corn supporting rolls are in such position on opposite sides of the row of corn that the stalks of standing corn prevent the ears which drop down upon said bottom rolls from passing therebetween to the ground, and the rotation of said bottom rolls causes the ears to be fed backward and upward toward the gripping rolls and rotary beaters and into position to be struck by the latter and thrown over the shield or guard board 4, and into the conveyer and husking mechanism hereinafter described, so that no corn is permitted to fall to the ground from said bottom rolls or from the elevator opening through which the corn is knocked by the rotary beater mechanism.

A pair of feed chains 44 having transversely or laterally projecting feeding fingers 45 thereon are mounted forward of and over the rolls u, v, 7 and 8, and rotary beaters 14 and 19, and on opposite sides of the passage t and are inclined upwardly and rearwardly from the forward ends of the shoes or forked frame portions a and b in such a position that the feeding fingers 45 extend across or interlap across the center of the passage t and move upward and rearward at an incline along said passage at a rate of speed corresponding with the forward movement of the machine, so as to feed the stalks rearward through said passage and between the gripping or feed rolls, and tend to raise the stalks which may be bent over. These finger feed-chains respectively, are supported in operative position by inclined supporting boards or frame portions 46 and 47 on one side of the passage and over the rotary beaters and one of the gripping rolls u, and similar upper and lower inclined frame portions or supporting boards 48 and 49 on the opposite side of the passage t and over the roll v. Sprocket wheels 50, rotatably mounted in adjustable bearings or supports 51 adapted to be adjusted to different positions in slots 52 in supporting strips or brackets 53, are located between the inclined frame portions or supporting boards on opposite sides of the passage t and in supporting engagement with the lower forward portions of the finger chains 44, and the upper rear portions of the endless feed or finger chains 44 are mounted in engagement with the teeth of similar sprocket wheels 54 which are supported in bearings 55 and between the inclined supporting boards or frame portions 46, 47, and 48, 49, on opposite sides of the passage t. These sprockets 54 are each provided with a stub shaft 56, and on each of these stub shafts is fixed a sprocket wheel 57. The sprocket wheels 57, respectively, are operatively connected with the counter shaft 31 by means of a pair of bevel gear wheels 58 fixed to said shaft 31, a pair of bevel gear wheels 59 fixed to stub shafts 60 journaled in bearings 61 and 62 and in toothed engagement with the bevel gears 58, sprocket wheels 63 fixed to said stub shafts 60 respectively, and sprocket chains 64 mounted upon and connecting the sprocket wheels 63 with the corresponding sprocket wheel 57, and all serving to operatively connect the respective finger chains 44 with the counter shaft 31 and with the source of power. An idler wheel 65 serves to keep the chain 64 which is over the rotary beaters taut.

Guard wheels or stripping wheels 66 having radial curved arms or spokes 67 of sufficient length to strip the stalks and fibrous material from the fingers 45 of the finger chains 44 are mounted adjacent to the upper rear portions of said finger chains respectively on stub shafts 68 on which are fixed sprocket wheels 69 which are in toothed engagement with the corresponding chain 64. These stripping wheels 66 are located between the supporting boards or inclined frame portions on opposite sides of the passage t so closely adjacent to the portions of the finger chains 44 which pass around the sprockets 54 that the radially projecting curved arms 67 overlap the fingers 45 of the finger chains and move from the inner portions toward the outer ends of said fingers as the latter turn around the sprocket wheels 54, so that the stalks and fibrous material are stripped from the fingers 45 and permitted to pass freely rearward or between the gripping rolls. (See Figs. 1 and 3.)

Mounted beside the gripping or feed roll v on the opposite side of the passage t from that on which the rotary beater mechanism is located, and in position to receive the ears of corn as they are knocked from the stalks by the rotary beaters, is a combined elevating, husking and separating mechanism which is constructed and adapted to operate as follows: An inclined elevator and husker frame is provided which by preference comprises inclined side boards or elevator side frame portions 70 and 71 connected at their upper ends by means of a metallic brace 72 and secured firmly in the main frame in any desired manner. Metallic bottom side-frame members 73 and 74, beneath the inclined side frame members 70 and 71 respectively form supports for tracks 75 which extend upward and rearward at an incline from points adjacent to the bottom ends of the gripping rolls and rotary beaters above described to a point over the discharge elevator 76 or other receptacle for receiving the corn after it has been operated upon. (See Fig. 3.) On these tracks 75 are mounted the upper laps of elevator or conveyer chains 77 which support transverse angle irons or cross strips 78 which are secured at their opposite ends to said conveyer chains 77 by means of bosses or lugs 79 projecting laterally on the inner sides of the links of the chains and riveted to the upwardly extending flange portions 80 of said strips 78. The upwardly extending portions of the strips 78 form blades or buckets for carrying the corn upward and are provided with extensions or curved bucket portions 81 riveted thereto as shown in Fig. 3. These curved upwardly extending bucket portions are located on opposite sides of a central partition 82' which is arranged between the side frame portions and over the cross strips 78 for guiding the corn along the husking rolls 82. These are arranged beneath the upper lap of the conveyer or elevator mechanism above described and at the same incline with the tracks 75, with narrow spaces between said rolls for permitting the husks and refuse material or fodder and shelled corn to pass downward to the under side of the husking rolls into the inclined space 83 on the inside of the inclined chute shown in cross section in Fig. 3 and the side walls 84 of which are formed of heavy sheet metal. The bottom of said chute is formed of reticulated or perforated material in the form of a screen 85 secured to and supported by side wall portions 86 and having perforations or openings 87 therethrough adapted to permit the shelled corn to pass on downward into a bottom shelled-corn chute 88 having an imperforate bottom. The returning or downwardly moving lap of the conveyer or elevator comprising side chains 77 and bucket portions 80 passes along lengthwise of and beneath the husking rolls 82 at an incline on the inside of the space 83 between the side wall portions 84 of the chute and over the screen bottom 85 (see Figs. 3 and 1) and carries with it the husks and fodder or refuse material, allowing the shelled corn to fall through the screen into the bottom chute 88.

A shelled-corn conveyer comprising a central sprocket chain 89 shown in Figs. 1 and 3, and transverse blades or buckets 90 secured to and carried by said chain, extends from end to end of the bottom chute 88 and has its upper lap above said screen and adapted to move downward along the upper side of the screen with or between the bucket portions 80 and 81 of the upper conveyer or elevator as the latter moves downward over said screen and beneath the husking rolls. The lower lap of the shelled corn elevator is beneath the screen 85, as shown in Fig. 3, and is adapted to move upward at an incline beneath said screen and inside of the bottom chute 88, so as to carry the shelled corn upward to the upper open end of said bottom chute and deliver it into the discharge elevator or receptacle 76. The screen-bottomed chute for discharging the husks and which provides the space 83 directly beneath the inclined husking rolls is open at the bottom forward end and is thus adapted to discharge the husks upon the ground as they are carried downward by the lower lap of the top elevator or conveyer cross pieces or buckets.

The top elevator is supported at its lower end by idler sprocket wheels 91 mounted upon a shaft 92 which is journaled in suitable bearings in the frame, as indicated in Fig. 1, said idlers being in supporting engagement with the chains 77 of said upper conveyer or elevator. The upper portion of said conveyer or elevator is supported at the upper end of the tracks 75 upon sprockets 93 which are fixed to a shaft 94 which is journaled in suitable adjustable bearings 95 and provided with an outer sprocket wheel 96 on said shaft and operatively connected with a sprocket wheel 97 on the driving shaft 27 by means of a sprocket chain 98 which is in engagement with the toothed peripheries of said sprockets 96 and 97.

The bottom endless conveyer or shelled corn elevator is supported at its lower end by an idler wheel 99 upon a stub shaft 100 which is mounted in a bracket 101 secured to and supported by the bottom end of the screen 85, as indicated in Fig. 1, said idler 99 being in engagement with the endless chain 89 of said shelled corn elevator or conveyer. The upper end of the shelled corn conveyer or elevator is supported by a central sprocket wheel 102 fixed to a shaft 103 which is journaled in suitable bearings in the upper portion of the elevator frame. (See Fig. 1.) The shaft 103 is provided with an outer sprocket wheel 104 fixed thereto and in toothed engagement with the chain 98 already described, and thereby operatively connected with the driving shaft 27 through the medium of the sprocket 97 already described.

The husking rolls are journaled at their upper ends in suitable bearings in a cross piece 105 shown in Fig. 2, which cross piece is secured to and supported at its opposite ends by the frame members 73 and 74 which are shown in Fig. 3. The lower ends of the husking rolls are supported in a similar manner by a similar or identical cross piece (not shown). The two inner husking rolls are provided with laterally projecting pins or studs 106 which are adapted to enter corresponding openings 107 in the adjacent outer husking rolls, as shown in Fig. 3. Each of the husking rolls is provided at its upper end with a spur pinion 108 as shown in Figs. 1 and 2, the pinions on the inner husking rolls being out of engagement with each other but in toothed engagement with the pinion of the adjacent outer roll, and each outer roll is also provided with a bevel pinion 109 fixed thereto above its spur pinion and in toothed engagement with a similar bevel pinion 110 mounted upon and in fixed relation to a shaft 111— there being two of said pinions 110, one for each pinion 109. The shaft 111 is provided with a sprocket wheel 112 fixed to its outer end, and is operatively connected with the driving shaft 27 already described, by means of a sprocket wheel 113 on said shaft 27 and a sprocket chain 114 upon and forming a connection between said sprocket wheels 112 and 113. The sprocket wheel 113 is provided with a clutch member 114' fixed thereto, and a movable clutch member 115 is slidably mounted upon and rotatable with the shaft 27 and provided with an operating arm or lever 116 pivotally mounted on the frame and operatively connected with a hand lever 117 by means of a bell crank lever 118 one end of which is connected with the arm 116 and the opposite arm of which is connected with the rear end of a connecting rod 119, the forward end of said rod being connected with said hand lever 117. The movable clutch member 115 is operated in one direction by said hand lever, and is adapted to be operated in the opposite direction by said lever, or any suitable ordinary means for operating clutches. The levers 42 and 117 are each provided with a segment 121 and 120 respectively, as shown in Fig. 2, and with a pawl (not shown) for holding them in different adjusted positions.

The discharge elevator 76 may be of any desired, or ordinary form, having a boot or casing 122 which is by preference hopper-shaped at the bottom and adapted to receive corn dropped therein from the conveyers already described. The conveyer chain 123 of the discharge elevator 76 is provided with transverse blades or buckets 124 secured thereto at suitable intervals, and said chain is driven by means of a sprocket wheel 125 on a shaft 126 which is journaled in a suitable bearing or bearings 127 and operatively connected with the driving shaft 27 by bevel gear mechanism (not shown) which may be of any ordinary or desired form.

A caster-wheel beam 128 is secured at its rear end to the axle of the machine and extends through a vertical opening in a guide 129 which is secured to the forward end of the main frame, and is provided, at its forward end with a caster wheel 130 mounted between the forked arms of a curved fork 131 secured to the bottom of or forming a part of an upright spindle 132 which is journaled in bearings or castings 133 and 134 bolted to said beam. A hand lever 135 pivotally mounted upon the caster-wheel beam is provided with an upwardly and downwardly movable lever arm 136 connected with the forward portion of the main frame by means of a connecting link 137, the lower end of which link is secured to the main frame by means of a lug 138 as indicated in Fig. 1. A toothed segment 139 adjacent to the lever 135 is adapted to receive a pawl 140 operated by a grip lever 141 and hold the lever 135 in any position to which it may be adjusted. The main frame of the machine may thus be tilted to any desired incline by raising or lowering the front end of the frame through the medium of the lever 135. A draw rod 142 is secured at its rear end to the axle of the machine and is provided with a clevis or link 143 at its forward end for connecting with the double-trees or other device for pulling the machine. A tongue 144 is connected with the main frame by means of eyes 145 secured to the main frame, eyes 146 secured to the tongue and a shaft 147 extending through all of said eyes and through the end of a brace 148, which is also secured at its forward end to the tongue. The driver's seat (not shown) is mounted upon the caster-wheel beam to which it is secured by means of a suitable support 149 in position to enable the driver or operator to readily reach the hand levers above described.

The upper ends of the husking rolls and the shafts and gears which extend across the elevator or are located at the upper end thereof are covered by a shield plate 110', the greater part of which is broken away in order to better illustrate the more important parts, and a similar plate 152 covers the bottom ends and bearings of the husking rolls and forms the bottom of the receptacle into which the corn is thrown by the rotary beater mechanism.

Springs 150, mounted upon one or more cross pieces or braces 151 are arranged at suitable intervals in the elevator frame or casing and above the husking rolls in position to press the ears of corn down upon the husking rolls and permit but yieldingly resist the upward movement of the ears as they are fed upward and rearward over and in contact with the husking rolls.

We claim:

1. In a machine of the class described, the combination of a frame provided with a longitudinal passage, feeding rolls journaled in the frame on opposite sides of the passage, husking rolls located on one side of the passage and adjacent to one of the feeding rolls, conveyer mechanism movable over the husking rolls, rotary beater mechanism journaled on the opposite side of the passage from the husking rolls and adjacent to one of the feeding rolls and adapted to rotate in a direction opposite to the direction of rotation of the latter, and means for operating the rotary beater, feeding rolls, husking rolls and conveyer mechanism.

2. In a machine of the class described, the combination of a frame provided with a longitudinal passage, feed rolls journaled in the frame on opposite sides of the passage, husking rolls located on one side of the passage and adjacent to one of the feed rolls, conveyer mechanism movable over the husking rolls and having openings in the direction of the upper surface of the latter for containing corn in contact with the husking rolls, rotary beater mechanism mounted on the opposite side of the passage from the husking rolls and in front of one of the feeding rolls and adapted to rotate in a direction opposite to the direction of rotation of the latter, and means for feeding corn between the rotary beater mechanism and the husking rolls.

3. In a machine of the class described, the combination of a series of inclined husking rolls, an endless conveyer having a lap adjacent to and extending from end to end of the rolls along the upper side thereof, means for moving the lap of the conveyer which is adjacent to the upper surface of the husking rolls upward at an incline in the direction of the upper ends of said rolls, rotary beater mechanism adjacent to the lower ends of the husking rolls, for removing ears of corn from the stalks and delivering them to the husking rolls, means for operating the rotary beater mechanism, and means for operating the husking rolls.

FRED H. ROLLINS.
MASSENA H. SNOW.

Witnesses:
DAVID H. FLETCHER,
JENNIE L. FISKE.